United States Patent
Holschbach et al.

(10) Patent No.: US 8,820,044 B2
(45) Date of Patent: Sep. 2, 2014

(54) DEVICE FOR FIXING AN END-SIDE OF A CHAIN

(71) Applicant: Rexnord Kette GmbH, Betzdorf (DE)

(72) Inventors: Franz Joseph Holschbach, Wallmenroth (DE); Ralf Steup, Betzdorf (DE); Bernhard Bleser, Polch (DE); Herbert Rapp, Hagen (DE); Ulrich Gerlach, Wissen (DE); Jörg Heuer, Betzdorf (DE); Michael Schopp, Scheuerfeld (DE); Jörg Lindemaier, Schwerte (DE)

(73) Assignee: Rexnord Kette GmbH (DE)

( * ) Notice: Subject to any disclaimer, the term of this patent is extended or adjusted under 35 U.S.C. 154(b) by 0 days.

(21) Appl. No.: 13/648,712

(22) Filed: Oct. 10, 2012

(65) Prior Publication Data

US 2013/0097989 A1 Apr. 25, 2013

(30) Foreign Application Priority Data

Oct. 11, 2011 (DE) .......................... 10 2011 115 501

(51) Int. Cl.
| | |
|---|---|
| B60P 1/44 | (2006.01) |
| F16G 15/02 | (2006.01) |
| F16G 13/12 | (2006.01) |
| F16G 15/00 | (2006.01) |
| F16G 13/08 | (2006.01) |
| B66B 7/08 | (2006.01) |
| F16G 13/06 | (2006.01) |

(52) U.S. Cl.
CPC ................ *F16G 13/12* (2013.01); *F16G 15/00* (2013.01); *F16G 13/08* (2013.01); *B66B 7/08* (2013.01); *F16G 13/06* (2013.01); *Y10S 414/134* (2013.01)

USPC .................. 59/93; 59/78; 59/86; 24/265 AL; 187/229; 187/234; 414/545; 414/921

(58) Field of Classification Search
USPC ............ 59/86, 93; 24/265 AL; 187/229, 234, 187/253; 414/545, 921
See application file for complete search history.

(56) References Cited

U.S. PATENT DOCUMENTS

| | | | | |
|---|---|---|---|---|
| 3,652,116 | A | | 3/1972 | Pruitt |
| 3,950,941 | A | * | 4/1976 | Ohrn ................................ 59/93 |
| 4,009,765 | A | * | 3/1977 | Leskovec et al. ................. 59/93 |
| 4,432,438 | A | * | 2/1984 | Robinson, Jr. ................ 187/227 |
| 4,526,251 | A | * | 7/1985 | Johannson .................... 187/229 |
| 4,883,191 | A | * | 11/1989 | Christensen ................ 24/116 R |
| 5,234,332 | A | * | 8/1993 | Hoenke et al. ................ 425/338 |
| 7,384,232 | B2 | * | 6/2008 | Morris .......................... 414/545 |

FOREIGN PATENT DOCUMENTS

| | | |
|---|---|---|
| DE | 3431317 C2 | 3/1986 |
| JP | H11268892 A | 10/1999 |
| JP | 2003-073090 A | 3/2003 |
| JP | 2004-189364 A | 7/2004 |

OTHER PUBLICATIONS

Communication from German Patent and Trademark Office dated Jan. 15, 2014.

* cited by examiner

*Primary Examiner* — David B Jones
(74) *Attorney, Agent, or Firm* — Quarles & Brady LLP

(57) ABSTRACT

The invention relates to a device for fixing an end-side of a flyer chain, wherein the fixing can be carried out by a clamping through the exertion of a force on partial sections of an outer circumferential surface of at least one plate-link of at least one end-side link of the flyer chain.

7 Claims, 4 Drawing Sheets

DEVICE FOR FIXING AN END-SIDE OF A CHAIN

CROSS-REFERENCES TO RELATED APPLICATIONS

This application claims the priority of German Patent Application, Serial No. 10 2011 115 501.9, filed Oct. 11, 2011, pursuant to 35 U.S.C. 119(a)-(d), the disclosure of which is incorporated herein by reference.

BACKGROUND OF THE INVENTION

The present invention relates to a device for fixing an end-side of a chain, in particular a flyer chain.

The following discussion of related art is provided to assist the reader in understanding the advantages of the invention, and is not to be construed as an admission that this related art is prior art to this invention.

A flyer chain which is also referred to as plate-link chain is a safety relevant component which is a load chain or safety lifting chain which usually serves as pulling unit for deflecting forces. The flyer chain is used in conjunction with hydraulically actuated cylinders or as counter weight chain. It ensures a high load bearing capacity in lifting devices and is most commonly used in lift masts of fork lifts. It also serves further important functions as counter weight chain in machine tools and as lifting chain in container lift cars.

A flyer chain is formed by chain bolts and plate-links in which distinction is made between outer, inner and intermediate plate-links, wherein the plate-links are lined up on the chain bolt in arrangements which for example are predetermined by norms such as ISO 4347.

Each chain link of a flyer chain is composed of outer plate-links and inner plate-links or intermediate plate-links which are pivotally connected to one another by chain bolts thereby forming a pivot joint. The outer plate-links usually have a press fit, wherein the chain bolts which are pressed into the outer plate-links can be additionally riveted. A press fit is established between the chain bolts and the outer plate-links. In order to ensure the pivotabiltiy, the inner and intermediate plate-links are usually provided with a sliding fit so that a clearance fit is established between the chain bolt and the inner or intermediate plate-links. Such a flyer chain is known from DE 34 31 317 C2.

Flyer chains are usually attached to the lift arm structure or fastened to the latter in lift direction via so called chain anchors. The free inner plate-links of the flyer chain engage in corresponding recesses of the chain anchor and are received by a bolt which has the same diameter as the chain bolt. The end plate-links have a greater bore and a greater division which is intended to ensure a simple and easy fastening to the chain anchor. However, for a secure connection, the chain anchor as well as the end of the flyer chain have to be specially configured, wherein the mounting of the flyer chain to the chain anchor is associated with a great effort.

It would therefore be desirable and advantageous to provide a simplified device for fixing an end of a flyer chain

SUMMARY OF THE INVENTION

The invention is based in the idea to replace the previous bolt connection with the chain anchor by a clamping or clamping connection which acts from outside on the outer contour or the outer circumference of end-side plate-links of the flyer chain. Such a clamping connection has the advantage to allow fastening an end-side of the flyer chain without further components which have to be specially adjusted or arranged to fit through the plate-links or to contact the plate-links. Outer contour or outer circumference here means the outer border of the plate-links which extends substantially parallel to the through openings for the chain bolt or parallel to the introduced chain bolt.

With the device according to the invention an end-side of a flyer chain can be fixed by means of a clamping with exertion of a force onto sub sections of an outer circumferential surface of at least one plate-link of at least one end-side link of the flyer chain. Preferably, an end-side link of the flyer chain is one of the links in the region of an end of the flyer chain, in particular one of the last two to five links of the flyer chain. The device has thus contact surfaces for the clamping of sub sections of the outer circumferential surface of at least one plate-link of at least one link with which the flyer chain is clamped in the device for forming a clamping connection. The flyer chain does not have to be specially configured for the clamping. A conventionally used flyer chain can be fixed with the device according to the invention.

Preferably, the contact surfaces of the device with which the sub-sections of the plate-links of a link come into contact with the inside of the device for establishing the clamping are arranged so that a direction of the longitudinal extension of (clamped) plate-links is different from the direction of the pulling force. At least one link of the fixed end of the flyer chain has at least one plate-link, which encloses an angle with the direction of the pulling force which is smaller than 90° measured relative to the direction of the pulling force. The plate-link is oriented slanted relative to the direction of the force which is exerted on the flyer chain.

Preferably, the device has an at least partially enclosed volume for receiving an end of the flyer chain which volume forms a partially enclosed receiving space for the end of the flyer chain. An at least partially enclosed volume allows forming contact surfaces for the partial sections of an outer circumferential surface of the at least one plate-link at the end-side end of the flyer chain, by way of which contact surfaces the clamping can be achieved. The more of the volume is enclosed the greater the contact surfaces between the device and the flyer chain to be fixed can be selected, wherein the clamping effect is increased with increasing contact surface.

The clamping can preferably be achieved by interconnectable walls, wherein the detachable connection allows achieving a simple construction for example via bolted connections and/or snap connections.

Further, the distance between the walls can preferably be changed in a modular fashion for example by using walls of different sizes, so that a modular construction can be realized in order to be able to fix or fasten different geometries of the flyer chain. The fastening of the flyer chain occurs in all cases by a clamping of the end-side plate-links via one or multiple partial sections of the outer contour or the outer circumferential surface.

Preferably, a contact surface can be provided for the plate-link of the last end link of the flyer chain. Particularly preferably, the contact surface for the plate-link of the end link is arranged so that it extends transverse to the direction of the pulling force on the flyer chain to be fastened or the surface normal of the contact surface is substantially parallel to the direction of the pulling force on the flyer chain. This creates a contact surface transverse to the pulling force which acts on the flyer chain which contact surface can act effectively.

The device can have a connection for a length-adjustable fastening device. The connection can occur by a clamping, snap or screw connection. The length-adjustable fastening device can be realized by a threaded rod as part of the fastening device. Such a configuration allows achieving a device in which the distance between the fixed end of the flyer chain and a fastening point of the device or on the fork lift mast structure is adjustable.

Preferably, the device has two opposing inner walls with a distance to one another which is greater than the plate-link height and smaller than twice the plate-link height. Such a configuration allows achieving an efficient clamping and with this an efficient fastening or connection of the plate-link chain to a lift mast structure.

Preferably, the distance of the two opposing inner walls is selected so that at least three end-side links of the flyer chain contact one another with the outer circumferential surface. In particular, a suitable distance between the opposing inner walls allows achieving that the plate-links of two of the three links which are spaced apart by the third link contact one another and are clamped, wherein the two links of the flyer chain are laid on top of one another. The end-side arranged links of the flyer chain are thus turned or laid onto one another and are clamped at sub sections of the outer circumferential surface by the inner walls.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
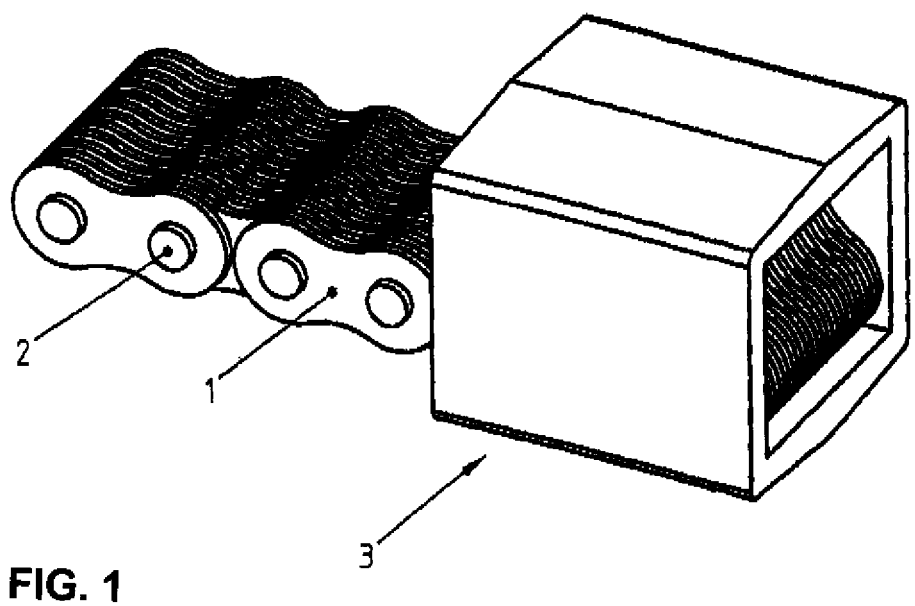
FIG. 1: shows an isometric schematic partial sectional representation of a device according to the invention with a fastened flyer chain.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a device according to the invention which serves as chain anchor of a flyer chain. The flyer chain which has plate-links 1 and chain bolts 2 is fastened in the device 3. The fastening occurs by way of a clamping in which a force is exerted on the sub sections of a circumferential surface of at least one plate-link which is arranged within the device 3. In the shown exemplary embodiment, the device surrounds the end-side links of the flyer chain with the corresponding plate-links 1. As can be seen from FIG. 2, the last link of the flyer chain is turned over onto the second to last link.

In the shown exemplary embodiment, a wall or inner wall 4 is detachably connected to an inner wall of the device 3. For fastening of the flyer chain in the device 3, the chain end of the flyer chain is introduced into the device 3, the last chain links are turned over and the device is closed by connecting the inner wall 4 with the inner wall 5, whereby a clamping force or clamping connection is formed which acts on the outside of the plate-links 1, namely on sub sections of the outer circumferential surface of the plate-links 1.

On the inner wall 5 a contact surface 6 is formed which extends perpendicular to the inner wall 5, against which contact surface 6 the plate-links 1 of the last chain link of the flyer chain rest. The contact surface 6 extends transverse to the direction of the pulling force which acts on the flyer chain, which pulling force is schematically drawn in by the arrow which is provided with the reference sign F.

The second to last link of the flyer chain is clamped in the device 3 so that the longitudinal extension of the plate-links of the second to last link have a direction which is different from the direction of the pulling force.

Figure 2:
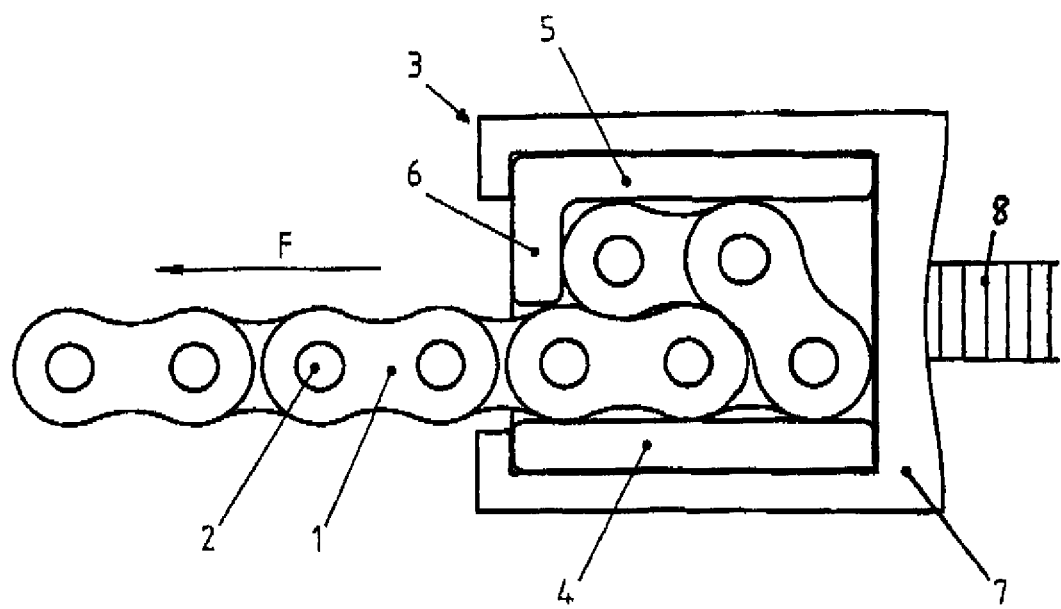
FIG. 2 shows a side view of the device of FIG. 1 with a fastening device.

In FIG. 2 a length adjustable fastening device 7 is also schematically shown, with which the distance between the fixed end of the flyer chain and a fastening point can be changed. For this, a threaded rod 8 is fastened to the fastening device 7 which is connected to the fastening device 7, with which fastening device a receiving device which has an internal thread can be adjusted in height.

Figure 3:
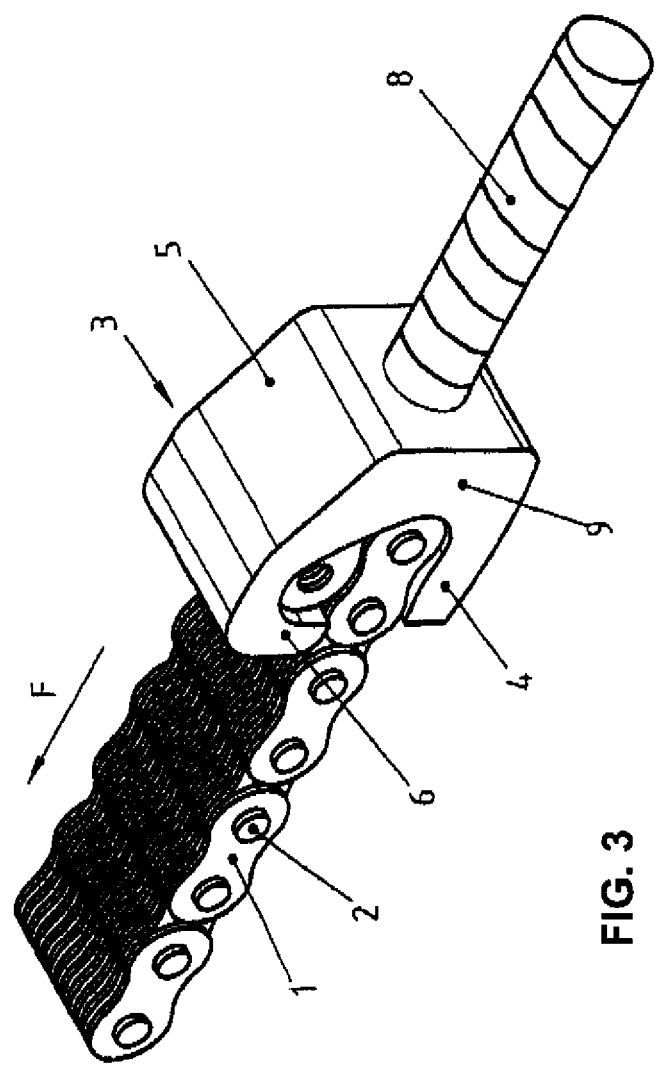
FIG. 3 shows an isometric representation of a further embodiment of a device according to the invention.
Figure 4:
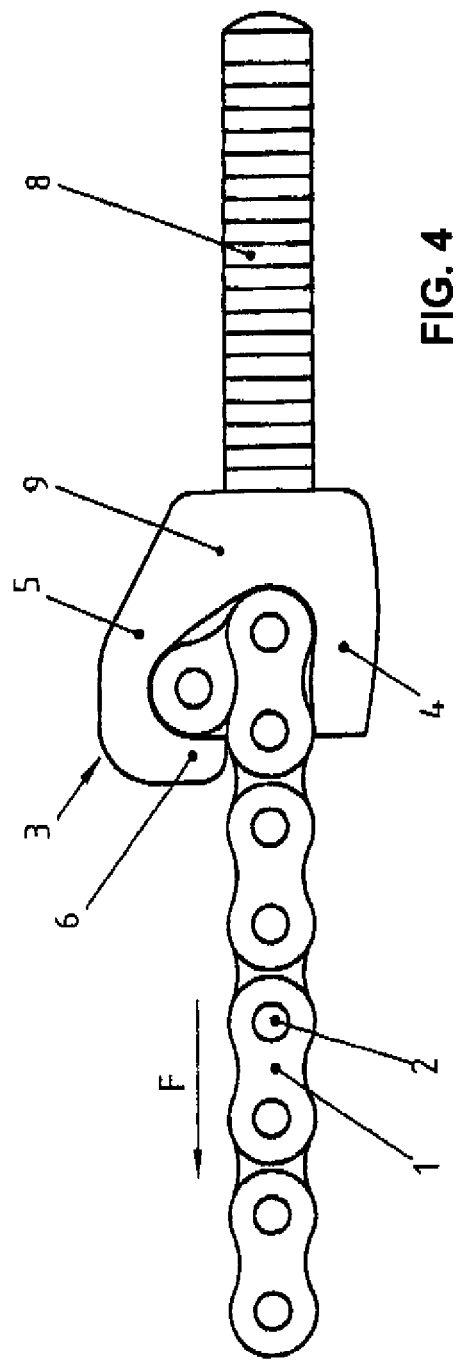
FIG. 4 shows a side view of the device of FIG. 3.

In the FIGS. 3 and 4 a further embodiment of a device according to the invention is shown. The inner walls 4 and 5 are fixedly connected with a basic wail 9. Further, the contact surface 6 is fixedly connected to the inner wall 5. The inner wall 4 and 5 and the contact surface 6 and the basic wall 9 can be configured one-piece from a single part. On the side of the basic wall 9 which is distal to the flyer chain, a threaded rod 8 is fastened. The fixing of the flyer chain inside the device 3 occurs, like the fixing in the first exemplary embodiment, by a clamping. The device 3 surrounds at least one end-side link of the flyer chain with the corresponding plate-links 1, and a part of the second to last link is also in contact with the device 3. The last link of the flyer chain is turned over onto the second to last link. For fastening the flyer chain according to a further embodiment, the end-side end of the flyer chain is inserted laterally into the device 3, wherein the last link is turned over onto the second to last link.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A device for fixing an end-side of a flyer chain, comprising:

non-detachably interconnected walls defining a receptacle, said receptacle having a side provided with an opening for receiving at least one end-side link of the flyer chain into the receptacle along a direction transverse to a longitudinal extent of the flyer chain, said walls being arranged in relation to each other so that a pulling force applied to the flyer chain along the longitudinal extent is absorbed by said walls via an outer circumferential surface of at least one plate-link of the least one end-side link received in the receptacle, thereby preventing movement of the at least one end-side link out of the receptacle in response to the pulling force.

2. The device of claim 1, wherein a direction of a longitudinal extent of the at least one plate-link received in the receptacle is different from the direction of the pulling force.

3. The device of claim 1, wherein one of the walls forms a contact surface for at least one plate-link of a terminal most link of the flyer chain.

4. The device of claim 3, wherein the contact surface extends transverse to the direction of the pulling force.

5. The device of claim 1, further comprising a length-adjustable fastening device for adjusting a distance between an end of the flyer chain fixed in the device and a fastening point of the device.

6. A device for fixing an end-side of a flyer chain, comprising:
   non-detachably interconnected walls defining a receptacle, said receptacle having a side provided with an opening for receiving at least one end-side link of the flyer chain into the receptacle along a direction transverse to a longitudinal extent of the flyer chain, said walls being arranged in relation to each other so that a pulling force applied to the flyer chain along the longitudinal extent is absorbed by said walls via an outer circumferential surface of at least one plate-link of the at least one end-side link received in the receptacle, thereby preventing movement of the at least one end-side link out of the receptacle in response to the pulling force, wherein two of said walls are arranged in confronting relationship to each other, and wherein a distance between the two confronting walls is greater than a height of the at least one plate-link and smaller than twice the height of the at least one plate-link.

7. The device of claim 6, wherein said distance is selected so that at least three of said end-side link of the flyer chain contact one another in at least said sub sections of the outer circumferential surface.

\* \* \* \* \*

UNITED STATES PATENT AND TRADEMARK OFFICE
CERTIFICATE OF CORRECTION

Page 1 of 1

PATENT NO.         : 8,820,044 B2
APPLICATION NO.    : 13/648712
DATED              : September 2, 2014
INVENTOR(S)        : Franz Joseph Holschbach et al.

It is certified that error appears in the above-identified patent and that said Letters Patent is hereby corrected as shown below:

In the Specification

Column 4, line 26 "wail 9" should be --wall--

In the Claims

Column 4, claim 1, line 66 "the least" should be --the at least--

Signed and Sealed this
Twenty-fifth Day of November, 2014

Michelle K. Lee
*Deputy Director of the United States Patent and Trademark Office*